United States Patent
Baker

[15] 3,689,132
[45] Sept. 5, 1972

[54] PANORAMIC OPTICAL SYSTEM

[72] Inventor: James G. Baker, Lexington, Mass.

[73] Assignee: Polaroid Corporation, Cambridge, Mass.

[22] Filed: June 29, 1970

[21] Appl. No.: 60,184

Related U.S. Application Data

[62] Division of Ser. No. 731,558, May 23, 1968, Pat. No. 3,605,592.

[52] U.S. Cl. .................. 350/189, 350/7, 350/202, 350/216, 350/220, 350/225
[51] Int. Cl. ......... G02b 3/04, G02b 9/34, G02b 9/60
[58] Field of Search ........ 350/6, 7, 202, 203, 199, 21, 350/22, 189, 198; 352/69; 95/15; 355/8

[56] References Cited

UNITED STATES PATENTS

| | | | |
|---|---|---|---|
| 1,812,851 | 7/1931 | Altman | 350/225 X |
| 2,912,494 | 11/1959 | Flint | 350/24 X |
| 1,520,245 | 12/1924 | Humbrecht | 350/202 X |
| 2,492,461 | 12/1949 | Bouwers | 350/199 |
| 3,001,448 | 9/1961 | Day | 350/189 X |
| 3,520,586 | 7/1970 | Bousky | 350/175 SL UX |
| 3,468,229 | 9/1969 | Bellows | 350/202 UX |

OTHER PUBLICATIONS

Rosin " Concentric Lens" Journal of the Optical Society of America, Vol. 49, No. 9, Sept. 1959, pp. 862– 864.

*Primary Examiner*—John K. Corbin
*Attorney*—Brown and Mikulka and William D. Roberson

[57] ABSTRACT

A corrected optical system is provided for a shallow camera that is characterized by an extremely short dimension between the forward position of the first refracting surface and the rearward position of the final image surface. In the compact hand-held camera illustrated herein as an example, the optical system is panoramic in operation, comprising: a pivotal scanning mirror (at one end of the camera); a slit (at the other end of the camera), past which the photosensitive film is moved at a rate, with which the scanning mirror rate is synchronized in order to synthesize a complete image from a continuous sequence of increments; and a lens array, including a stationary shell and an objective array that, in one form, is pivoted at a rate, with which the scanning mirror rate is synchronized, in order to impart to the complete image a high state of correction. The objective array, which is characterized by an unusually short distance between front and rear refracting surfaces, is useful in other applications.

13 Claims, 7 Drawing Figures

INVENTOR.
JAMES G. BAKER
BY Brown and Mikulka
ATTORNEYS

PATENTED SEP 5 1972 3,689,132

INVENTOR.
JAMES G. BAKER
BY *Brown and Mikulka*

ATTORNEYS

PANORAMIC OPTICAL SYSTEM

This is a division of copending application Ser. No. 731,558, filed May 23, 1968, now U.S. Pat. No. 3,605,592.

BACKGROUND AND SUMMARY OF THE DISCLOSURE

The present invention relates to photographic optics and, more particularly, to a corrected optical system for a shallow camera that is characterized by an extremely short dimension between the forward position of the first refracting surface and the rearward position of the final surface. Such an optical system is adapted for incorporation into a hand-held camera, the height and width of which are sufficiently large to accommodate a fully size photographic frame that may be developed directly by diffusion transfer or the like but the thickness of which is sufficiently small to permit the camera to be carried unobtrusively in a clothing pocket or the like. Prior cameras having a like shallow front to back depth have been characterized by relatively small images because of the usually occurring relationship between format size and focal length. In one type of camera incorporating a lens system of the present invention (see U.S. Pat. application, Ser. No. 549,961, filed May 31, 1966, in the name of Edwin H. Land), the optical system is panoramic in operation. In one form, such a camera comprises: a pivotal scanning mirror (at one end of the camera); and a slit (at the other end of the camera), past which the photosensitive film is moved at a rate, with which the scanning mirror rate is synchronized, in order to synthesize a composite image from a continuous sequence of increments. In the design of such a compact system, it has been found that severe difficulties are encountered in attempting to compensate for perspective distortions and to achieve good image quality by correction of aberrations.

A primary object of the present invention, for reasons that will be explained in detail below, is to provide an objective array, which is characterized by an unusually short distance between front and rear refracting surfaces, so that in one form it is adapted to pivot in relation to a stationary shell lens component in order to provide correction of aberrations resulting from a panoramic scanning operation. In another form, the objective array is stationary and the shell lens component is stationary, the latter providing residual correction for the former and there being sufficient spacing between the latter and the former to enable pivotal movement therebetween of an auxiliary optical component such as a scanning mirror. In a shallow hand-held camera characterized by an extremely short dimension between the forward position of the first refracting surface and the rearward position of the final image surface, for example, such a panoramic scanning operation involves an X-direction along which radiation from a field of view is received, a Y-direction with which a slit, that defines successive increments of a panoramic image is parallel, and a Z-direction with respect to which relative motion occurs between the slit and a photographic film at the image surface. Although examples of the aforementioned shallow optical array are given herein as being useful in a panoramic hand-held camera, it is to be understood that certain of the specific details are useful in other arrangements where similar problems of limited space and/or aberration correction are encountered.

Other objects of the present invention will in part be obvious and will in part appear hereinafter.

The invention accordingly comprises the apparatus possessing the construction, combination of elements and arrangements of parts, which are exemplified in the following detailed disclosure, the scope of which will be indicated in the appended claims.

BRIEF DESCRIPTION OF THE DRAWINGS

For a fuller understanding of the nature and objects of the present invention, reference is made to the following detailed description, taken in connection with the accompanying drawings, wherein.

DETAILED DESCRIPTION OF THE INVENTION

Figure 1:
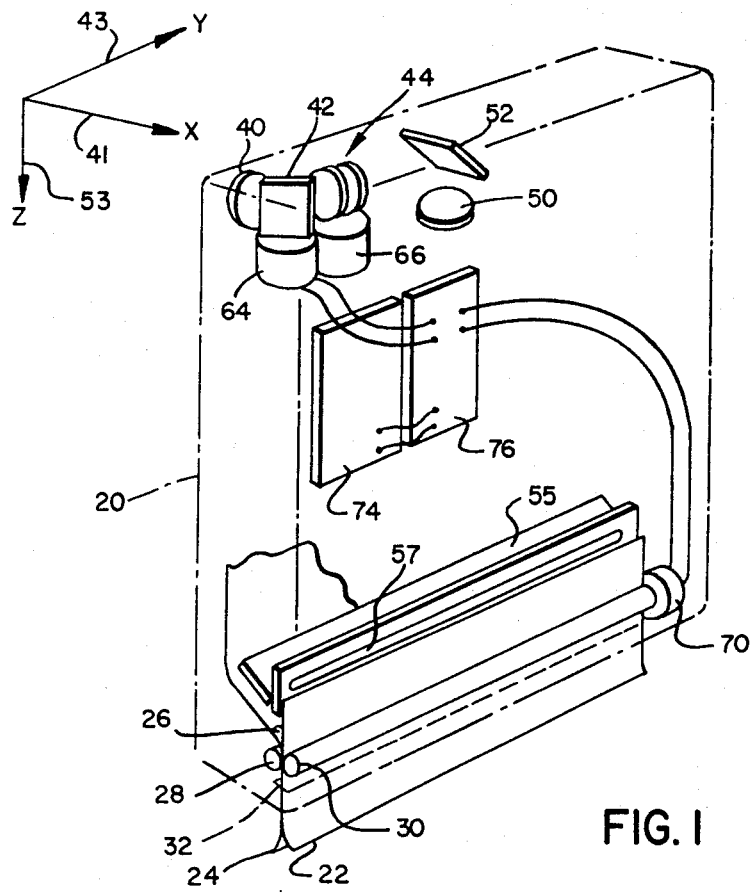
FIG. 1 is a perspective view of a shallow camera incorporating a lens system embodying the present invention.

The Panoramic Camera of FIG. 1

Generally, the camera of FIG. 1 comprises a housing 20, shown in phantom lines, that encloses and supports the optical and photographic components. The photographic components, for example, include a photosensitive stratum 22 and an image receptive stratum 24, the former being constituted for advancement relative to the optical system in a manner to be described below and the latter being constituted for superposition with the latter in the presence of an interposed processing fluid 26, by operation of a pair of pressure rollers 28, 30. The resulting sandwich is ejected through a lighttight slot 32 at an extremity of the camera and the resulting picture may be stripped from the sandwich thereafter. Details of the compositions of photosensitive stratum 22, image receptive stratum 24 and processing fluid 26 are described in U.S. Pat. No. 2,543,181, issued on Feb. 27, 1951 in the name of Edwin H. Land. It will be understood that other configurations of photosensitive and receiving strata are contemplated, one such configuration specifically including the photosensitive and receiving strata in an integrated sheet. In some instances, where special optical performance is desired, slight projection of the forward optical component may occur in operation and retractable means may be used for minimizing camera thickness for storage.

Figure 2:
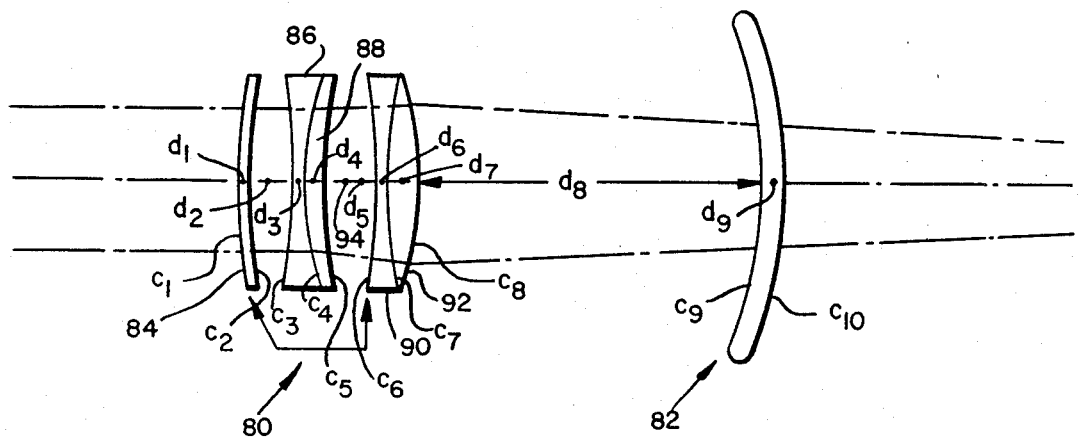
FIG. 2 is an unfolded, cross-sectional, layout view of a compound objective lens system embodying the present invention.

The Optical System of FIGS. 1 and 2

The parts of the optical system now will be described generally to provide preliminary comprehension of overall function and operation, as a basis for the detailed explanation to follow. The specific optical system of FIG. 2, which is incorporated into the camera of FIG. 1, will be referred to generally, it being understood that the systems of FIGS. 3 to 7 are substituted for the system of FIG. 2 in modifications of the camera of FIG. 1. As shown in FIGS. 1 and 2, the illustrated camera comprises: a window 40 which communicates the optical system with the objective view along an X-direction 41; a scanning mirror 42, which varies the attitude of the optical system with respect to the objective view while deflecting the optical path along a Y-direction 43; a pivoted objective lens array 44 for imaging flux from the scanning mirror, while maintaining predetermined correction; a shell lens component 50 for completing correction of the image produced by the pivotal objective lens; a plane mirror (or alternatively a totally internally reflecting prism if altogether on the object side of the first refracting surface) 52 for deflecting the optical path along a Z-direction 53; and an elongated mirror 55 and slit 57 for deflecting the optical path along the X-direction to the image surface and the photosensitive stratum therein. In operation, a suitable drive 64, 66, 70 pivots scanning mirror 42, pivots objective lens array 44 and rotates pressure rollers 28, 30, synchronously, in order to advance photosensitive stratum 22 past slit 57 and spreads processing fluid 26 between photosensitive stratum 22 and print receptive stratum 24 as the sandwich formed thereby emerges from lighttight slot 32 in housing 20. As shown, drive 64, 66, 70 includes three mechanically isolated, miniature torque motors, that are powered by a dry cell 74 under the control of a solid state circuit 76. Following a development period, conventionally ranging between 10 seconds and a minute, the photosensitive and image receptive strata are stripped apart to reveal the regular-size photographic print. A shutter (not shown) at window 40, in one form, assists scan mirror 42 in excluding undesired light from within the camera housing and a closure (not shown) at the back of the camera housing enables reloading thereof conveniently. It will be understood that the principles of the present invention are applicable, as well, to any scanning systems having analogously stationary and movable components.

Design Considerations — The Camera of FIG. 1

A panoramic camera of the type disclosed introduces a number of problems not ordinarily encountered in snap-shot photography. For example, in the present case, photosensitive stratum 22 is to be moved at a constant rate past slit 57 while lying in a plane at right angles substantially with respect to original X-direction 41. Ordinarily, a flat field lens system produces an image on a photosensitive stratum at the focal plane. However, in the present case, when the field of view is scanned by such means as diagonal sweep mirror 42, in the meridional plane, the image rate is exactly that of the photosensitive stratum rate only at the center of the scan. With a reasonably narrow slit width, in the present case a maximum of 0.4 inches, there is a slight but acceptable blurring which is caused by the slight difference between the positions of points along an arcuate cylindrical surface defined by the scan mirror about its axis and the corresponding positions of points along a plane that would be defined by the operation of the lens system itself. Along the length of slit, it obviously is necessary that the optical design produces a flat image in the Z-direction and that the distortion over the full length of the slit be held to say ± 1 percent of the mean value adopted for the entire panoramic image. To this extent, the optical design for this panoramic camera becomes similar to that of a snap-shot camera. However, a snap-shot camera would require a wider field inasmuch as the diagonal of a square image, for example, would be 1.4 times the length or width of the image. The optical design of the contemplated panoramic camera need only cover the width of the image since the length is generated by the scanning operation, and no diagonal dimension is encompassed by the optical system. The optical systems of FIGS. 2 to 7, which are designed to correct aberrations resulting from the scanning operation, as well as the usual aberrations, each includes at least one pivotal optical component and a shell lens, which cooperate in a manner now to be described.

Design Considerations — The Illustrated Optical Systems — General

It will be recalled that a Schmidt type system involves two important principles, which provide a high state of optical correction with a minimum number of optical components. The first of these principles is that of placing a stop at the center of curvature of a spherical mirror or other surface in order to take advantage of the perfect mathematical symmetry of the sphere. The second of these principles involves the insertion of another optical component at the position of the stop. With specific reference to the optical system of the present invention, a concentric shell, i.e., a shell having concentric surfaces, can be effective in aiding the correction of spherical aberration without the introduction of coma or astigmatism when the shell is positioned so that its center of curvature lies at the real stop of the system or the conjugate image thereof. More than one shell can be used, a preferred arrangement being two opposed shells at opposite sides of the stop or stop image. Such a pair of opposed shells tend to preserve higher order symmetry in the presence of aberrations caused by other surfaces. A concentric shell is not advantageously applicable to all optical systems. The shell per se is not strongly dependent on choice of glass, being of rather weak optical power unless very thick or very curved. For example, in many cases an index of refraction ($N_d$) of 1.5 will suffice with a thicker though quite transparent shell for the numerous such glass types available, as compared to an index of 1.7 more or less, where the shell would be thinner but not necessarily more transparent, all for the same degree of correction.

In accordance with the present invention, a shell is introduced in order to make possible an objective array that is characterized by an extremely short distance between front and rear refracting surfaces, say in the range of from 6 to 15 percent of the focal length, for the purpose of permitting substantial pivotal movement of the objective array or another optical component associated therewith within an extremely limited space. The normal camera lens for optimum performance, designed of relatively inexpensive materials, usually requires a barrel length (distance from front to rear surface vertices) of the order of 20 percent of the equivalent focal length. Faster lens systems, for example, ranging from f/4 to f/1, usually have even longer barrels, if only to contain the increased number of elements associated with improved performances at low f/ numbers, but designwise to obtain the variation in relative height of the rim ray on axis needed to retain a net power from an array of positive and negative elements or surfaces. From a design standpoint, the concentric shell is less versatile than the usual lens element. The usual lens element has two free radii, a central thickness, a choice of index and dispersion, and if necessary, each of the two surfaces can be aspheric. The number of free parameters therefore is at least 5 and effectively often can be 9. (That is, if the element is aspheric, the coefficients of the 4th and 6th degree polynomial terms in the equations defining the aspheric shape can be significant in the usual design process). In contrast, the concentric shell has only a single radius and central thickness, the second radius necessarily being determined by the concentric stipulation. In addition, the choice of index is not very effective inasmuch as a change in thickness can offset the change in index without any very marked difference in optical behavior. The dispersion remains a free parameter but because the optical power of shells is generally low, a substantial change in dispersion usually results in a limited change in design. Finally, by definition, the concentric shell is not aspheric. If an aspheric shape is introduced, one might as well deform the shell from pure concentricity beforehand. The number of free parameters for the concentric shell is therefore only 3 or 4 with only the first 2 being important.

Generally a photographic objective having a flat field performance must be so designed as to have a small Petzval sum. As a rule, at least for all refractive systems, the final value of the Petzval sum is small and positive. A small positive value means that the radius of curvature of the image surface in the central field is large but not infinite and that the image surface is weakly concave toward the objective lens itself. Usually, the higher order Seidel terms defining the shape of the image surface are over-corrected causing the image surface to bend backward away from the objective lens at the higher angles. Therefore, there is a zonal departure from the main flat image plane producing a maximum departure at some selected off axis angle. The corner image is often beyond the mean image plane. A good design will restrict the departure of the image surface from the mean plane to perhaps plus or minus 0.5 mm. If diffraction resolution is required, it may be necessary to deform the photographic emulsion to follow the best image surface, or to restrict the field of view. Various lens forms differ in how flat a field they can produce. In general, the more curved the elements become around a central stop (along with detailed design optimization), the flatter the image surface becomes. As the elements become increasingly curved, however, the spherical correction and other aberrations begin to limit the attainable aperture-ratio. Thus f/2 lenses might cover a 50° field effectively, though 5 or 6 elements might have to be used. If a 95° field is required, however, the speed might be restricted to f/4.5 and the lens form can become very different. If the Petzval sum is small, for all refractive systems one must employ strong negative as well as positive refractions. The Petzval sum, however, does not contain air spaces or lens thicknesses. If the negative and positive refractions are close together, the lens system retains little optical power. If such a design is rescaled to a standard focal length, the individual curvatures then become very enhanced and one cannot expect good optical performance in the higher orders. Therefore, large air spaces and glass thicknesses can be introduced in order to separate the negative surfaces from the positive. In a more general way one tries to have the relative height of the rim ray on-axis large at positive surfaces and low at negative surfaces. The Petzval sum does contain the index of refraction for each surface contribution. The type of optical glass is chosen to be most useful in flattening the field while minimizing the other aberrations for a given net optical power of the system as a whole. It is generally true that a high index favors the Petzval sum where the element is of net positive power and that a low index favors the sum where the element is of net negative power. Thus, in a Cooke triplet one might find that the first and third elements, which are positive, would have indices of, say, 1.5 to 1.8, whereas the central negative element might have an index of 1.55 to 1.75. A lower index for the negative element would be still more favorable but one must color correct the system. The usual low index materials do not generally have enough dispersion, though in unusual cases one might resort to crystalline materials where satisfactory indices and dispersions exist. However, other aberrations also are dependent on index and curvature. The low index negative element is bound to have relatively strong concave surfaces which in turn enhance the over-correction in the outer field or for large aperture-ratios. If the index is raised, one can indeed reduce these surface curvatures at a faster rate than the Petzval sum suffers with a consequent improvement in performance. Similarly, if the outer positive elements are reduced in index, the stronger surface curvatures tend to compensate the overcorrections from the central negative element in a way that outstrips the damage to the Petzval sum. Thus Cooke triplets with the apparent unfavorable distribution of indices ordinarily have long barrel lengths. That is to say, if large air spaces are introduced, the relative heights are favorable, producing a better effect on the Petzval sum than the damage done by the inverted sequence of indices. The weaker curvatures associated with the negative central element therefore produce less over-corrections and this effect is all the more beneficial if the index of the central element is high. The worst condition is to have all low indices, whether in a triplet or in a more complicated lens form. High indices properly used favor good correction, subject to such considerations as cost, transmission, weather resistance and the like. It is apparent that a lens design of the present type involves a variety of often conflicting requirements. If more elements are used, it is obvious that an increased number of degrees of freedom exist. For example, if the negative central element of the Cooke triplet is split into two adjacent elements, the higher order over-corrections immediately become weaker, the lens barrel can become shorter for the same distribution of optical powers and the Petzval sum can be favored more readily by using high indices for the positive and low indices for the negative elements. The resulting 4 element form results in many solutions.

One can still have a long barrel and obtain quite low aperture ratios, for example, $f/3$, whereas if the barrel length if short, the system might be restricted to $f/6.3$, etc.

In the illustrated panoramic scanning system, if the objective lens is to swivel or pivot around a central point on the optical axis or if a scanning mirror is to pivot between the objective lens and a shell lens within a limited region, the barrel length cannot be great or the objective lens will strike the walls or limit movement of the scanning mirror. If the barrel length is to be short, one must resort to high index elements for the positive elements and to a medium or low index for the negative element or elements. If plastic elements are to be used, a much greater restriction is placed on design. In other words, if the barrel is short, the internal lens powers are large. Such an objective even if adequately designed becomes sensitive to small thermal changes and optical misalignments. In a typical panoramic system of the present type, the objective lens pivots about a central point, which preferably is the location of the real stop of the system. If image movement is not otherwise compensated, preferably this pivot point is located at the second principal point of the objective system. By introducing one or more concentric shells into the objective system, it is apparent that if the center of curvature of the shell or shells is located optically at the pivot point, the shell or shells do not need to share the pivoting or swiveling of the remaining portion of the objective lens. That is, it makes no difference whether the shells pivot or are stationary as long as good alignment is maintained. Under such circumstances, it is possible to make use of the optical contribution of the shell or shells, restricted as they may be, to take some of the design burden away from the rest of the objective and thereby to allow for a shorter barrel length and reduced aberrations in the portion that pivots.

A concentric shell optically is negative in power and, therefore, reduces the Petzval sum. A thick concentric shell will reduce the sum even more, but will cause loss of power. However such a thick concentric shell located near the image surface subtracts relatively little optical power from the rest of the system while reducing the Petzval sum markedly. It often is possible, and insofar as the higher order terms are concerned often is advisable, to employ a shell on either side of the pivot point or alternatively to have more than one shell on either side if some other optical requirement exists. With respect to the lower order contributions, multiple shells can be combined into a single thicker shell, either on opposite sides or on the same side of the pivot point. With respect to the higher order contributions, the intercepts of the rays on the concentric shells are determined partly by the refractions and aberrations of the other elements, resulting in a need to retain as much symmetry as possible or to alter the symmetry in a preferred direction.

The Optical System of FIG. 2

The optical system of FIG. 2 includes a compound objective lens array 80 and a shell lens component 82. Objective lens array 80, in sequence, includes: a first negative component in the form of a meniscus lens 84, a second negative component in the form of a double concave negative lens 86 and a positive meniscus lens 88; and a third positive component in the form of a double concave, negative lens 90 and a double convex, positive lens 92. Objective lens array 80 pivots as a unit about point 94, which is at the center of curvature of shell lens 82.

Numerical details of the optical system of FIG. 2 are presented in the following table, in which the values of curvature (C) and distance (d) are in terms of equivalent focal length:

TABLE 1

| Lens or Airspace | Curvature | Thickness or Spacing | Index of Refraction $N_d$ | Abbe Number $V_d$ |
|---|---|---|---|---|
| 84 | $C_1 = 1.609$ | $d_1 = 0.006$ | 1.501 | 56.4 |
| Airspace | $C_2 = 1.723$ | $d_2 = 0.030$ | | |
| 86 | $C_3 = -0.963$ | $d_3 = 0.006$ | 1.501 | 56.4 |
| 88 | $C_4 = 4.966$ | $d_4 = 0.016$ | 1.617 | 31.0 |
| Airspace | $C_5 = 2.432$ | $d_5 = 0.040$ | | |
| 90 | $C_6 = -1.348$ | $d_6 = 0.006$ | 1.617 | 31.0 |
| 92 | $C_7 = 3.651$ | $d_7 = 0.020$ | 1.691 | 54.7 |
| Airspace | $C_8 = -4.024$ | $d_8 = 0.240$ | | |
| 82 | $C_9 = -3.500$ | $d_9 = 0.016$ | 1.501 | 56.4 |
| | $C_{10} = -3.314$ | | | |

In the foregoing system, the speed = $f/8$, the focal length = 5.291 inches and the back focal distance = 4.445 inches.

In the illustrated form of the optical system of FIG. 2 all elements are composed of glass. In an alternative form, closely similar plastic materials are employed, for example, lens elements 84 and 86 are composed of molded methyl methacrylate, lens elements 88 and 90 are composed of molded styrene and lens element 92 is composed of ground and polished glass. It will be observed that objective lens array 80 is quite compact. In the illustrated embodiment, surfaces $C_1$, $C_5$ and $C_6$ are slightly aspheric to complete the desired corrections. It will be observed also that the overall length, including shell lens 82, is great in comparison with the equivalent focal length, a circumstance that is useful in the shallow camera illustrated in FIG. 2. Because of the compactness of objective lens array 80, this array can swivel, pivot or rotate about the center of curvature of the shell while the shell remains stationary. In consequence, a flat field lens (not shown), or a zoom lens (not shown), in various modifications, is used for panoramic scanning at any appropriate position without at the same time incurring either distortion, perspective errors or defocusing.

Figure 3:
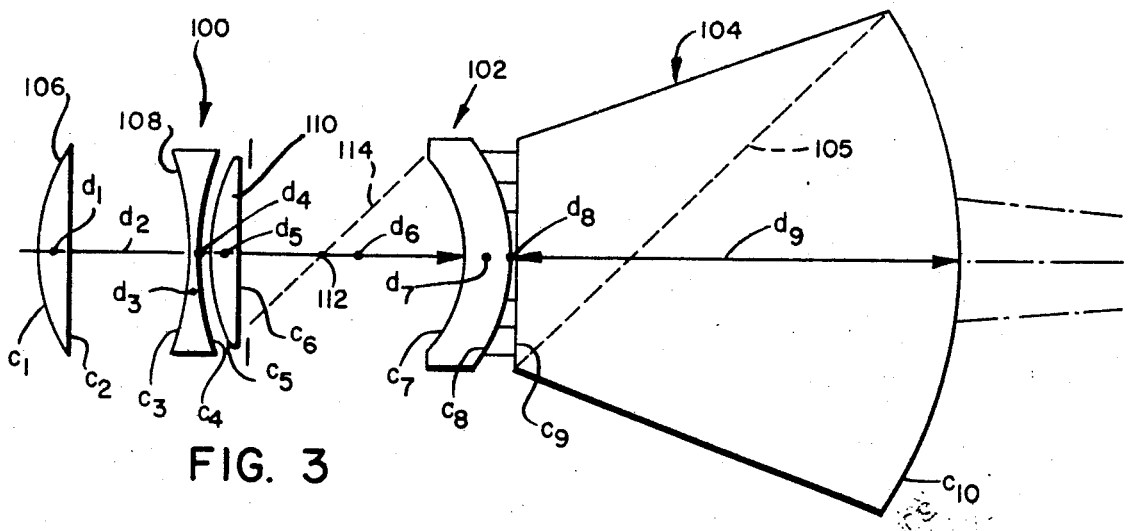
FIG. 3 is an unfolded, cross-sectional, layout view of a Schmidt type lens system embodying the present invention.

The Optical System of FIG. 3

The optical system of FIG. 3 includes a forward lens array 100, a shell lens component 102 and a Schmidt type lens component 104. Forward lens array 100 includes a positive plano convex forward lens 106, a negative double concave medial lens 108 and a positive plano convex rearward lens 110. The radius of concentric shell 102, which is at 112, is sufficiently large to permit a diagonal mirror (positioned as shown in phantom lines) 114 to be interposed between forward lens array 100 and shell lens component 102. In one modification, the configuration is similar to that of FIGS. 1 and 2, with a forward scanning mirror and with mirror 114 stationary. In another modification, the forward mirror is stationary and mirror 114 is pivoted for scanning. In the latter case, the elements of forward lens array 100 remain stationary inasmuch as they simply produce a still image in the object space or long conjugate side of the scan mirror. In the form shown, shell lens component 102 generates collimated light. In one embodiment, the forward surface of Schmidt type lens component 104 has a correcting aspheric surface and the rearward surface, which is spherical, has a center of curvature located at this forward surface. In another modification, the center of curvature of the rearward surface is located at the center of curvature of shell lens component 102, in which case no aspheric shape at the forward surface is necessary. In the form shown, the dashed line at 105 indicates the position of the hypoteneuse of prism elements that are formed in one modification of the system of FIG. 3, in which single element 104 is broken into two elements.

Numerical details of the optical system of FIG. 2 are presented in the following table, in which the values of curvature (C) and distance (d) are in terms of equivalent focal length:

TABLE 2

| Lens or Airspace | Curvature | Thickness or Spacing | Index of Refraction $N_d$ | Abbe Number $V_d$ |
|---|---|---|---|---|
| 106 | $C_1 = 5.142$ | $d_1 = 0.025$ | 1.641 | 60.1 |
| Airspace | $C_2 = 0.292$ | $d_2 = 0.106$ | | |
| 108 | $C_3 = -2.853$ | $d_3 = 0.005$ | | |
| Airspace | $C_4 = 5.149$ | $d_4 = 0.013$ | | |
| 110 | $C_5 = 5.235$ | $d_5 = 0.025$ | 1.501 | 56.4 |
| Airspace | $C_6 = -0.245$ | $d_6 = 0.190$ | | |
| 102 | $C_7 = -8.000$ | $d_7 = 0.042$ | 1.501 | 56.4 |
| Airspace | $C_8 = -6.000$ | $d_8 = 0.005$ | | |
| 104 | $C_9 = \text{plano}$ | $d_9 = 0.385$ | 1.640 | 60.1 |
| | $C_{10} = -2.597$ | | | |

In the foregoing system, the speed = $f/5.6$ and the distance to the image from $C_{10} = 0.594$ of the focal length of the overall system.

Figure 4:
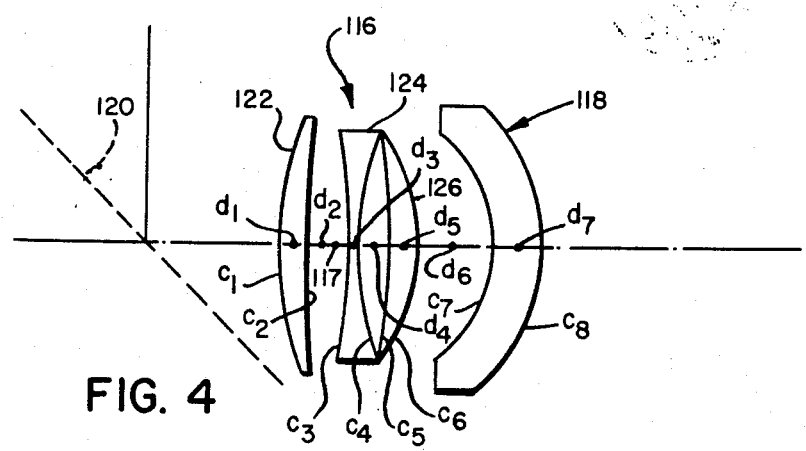
FIG. 4 is an unfolded, cross-sectional, layout view of another objective lens system embodying the present invention.

The Optical System of FIG. 4

The optical system of FIG. 4 includes a forward objective array 116 and a rearward lens component 118, both on the same side of a scanning mirror 120. As shown, forward objective array 116 includes a positive meniscus lens 122, a negative double-concave lens 124 and a positive meniscus lens 126. It will be observed that lenses 122, 124, 126 are within an extremely compact space, the distance along the optical axis from the front surface of lens 122 to the rear surface of lens 126 being substantially smaller than the average diameter of lenses 122, 124, 126. The system as a whole, nevertheless, for reasons already explained is a flat field photographic system corrected for all the usual monochromatic and chromatic aberrations to yield good performance. Objective array pivots about point 117, which is the refracted center of curvature of shell lens component 118.

Numerical details of the optical system of FIG. 4 are presented in the following table, in which the values of curvature (C) and distance (d) are in terms of equivalent focal length:

TABLE 3

| Lens or Airspace | Curvature | Thickness or Spacing | Index of Refraction $N_d$ | Abbe Number $V_d$ |
|---|---|---|---|---|
| 122 | $C_1 = 3.243$ | $d_1 = 0.025$ | 1.640 | 60.1 |
| Airspace | $C_2 = 0.880$ | $d_2 = 0.037$ | | |
| 124 | $C_3 = -1.671$ | $d_3 = 0.005$ | 1.564 | |
| Airspace | $C_4 = 3.129$ | $d_4 = 0.005$ | | |
| 126 | $C_5 = -1.536$ | $d_5 = 0.025$ | 1.640 | 60.1 |
| Airspace | $C_6 = -5.844$ | $d_6 = 0.065$ | | |
| 118 | $C_7 = -8.000$ | $d_7 = 0.042$ | 1.501 | 56.4 |
| | $C_8 = -6.000$ | | | |

In the foregoing system, the speed = $f/5.6$ and the distance from surface $C_8$ to the image = 0.877 of the focal length.

Figure 5:
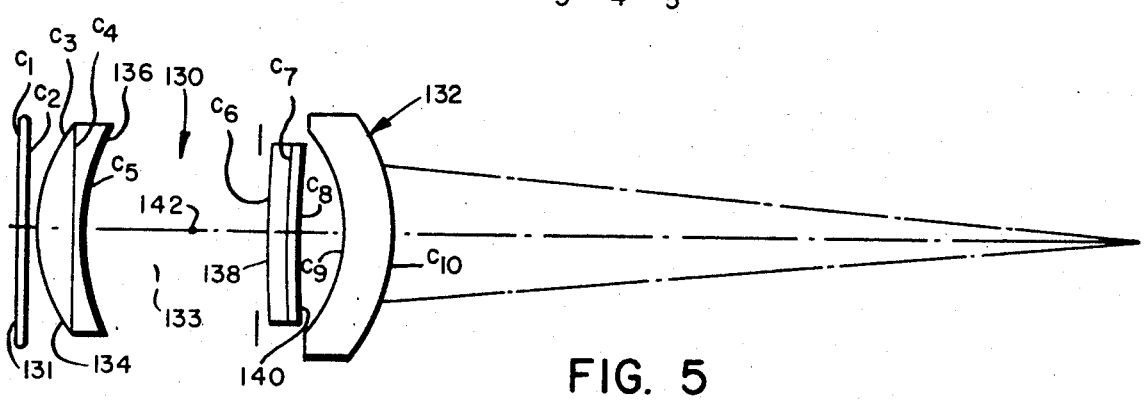
FIG. 5 is an unfolded, cross-sectional, layout view of a Petzval lens system embodying the present invention.

The Optical System of FIG. 5

The optical system of FIG. 5 includes a Petzval type objective array 130 and a shell component 132, a scanning mirror 133 being positioned within the objective array. The forward portion of objective array 130 includes, in sequence, a relatively weak, positive plano convex lens 131, a relatively strong, positive plano convex lens 134 and a negative plano concave lens 136. The rearward portion of objective array 130 includes a relatively weak, positive meniscus lens 132 and a relatively weak negative meniscus lens 140. Although, in the illustrated embodiment, all of the lens elements are composed of glass, in alternative embodiments, one or more of the lens elements are composed of plastic. In the illustrated embodiment, forward portion 131, 134, 136 remains stationary and rearward portion 138, 140 is orbited or rocked about the center of curvature 142 of shell component 132. Introduction of the shell, as indicated previously, helps to correct the Petzval sum, the spherical aberration and the longitudinal color. The remainder of the system therefore is designed with less stringent conditions to meet. In alternative systems substituting objective lens elements of analogous shape and higher indices of refraction for objective lens elements 131, 134, 136, it is obvious that quite short systems of good optical correction and fast aperture ratio are obtained.

Numerical details of the optical system of FIG. 5 are presented in the following table, in which the values of curvature (C) and distance (d) are in terms of equivalent focal length:

TABLE 4

| Lens or Airspace | Curvature | Thickness or Spacing | Index of Refraction $N_d$ | Abbe Number $V_d$ |
|---|---|---|---|---|
| 131 | $C_1 = 0.400$ | $d_1 = 0.010$ | 1.501 | 56.4 |
| | $C_2 = \text{plano}$ | | | |

| Lens or Airspace | Curvature | Thickness or Spacing | Index of Refraction $N_d$ | Abbe Number $V_d$ |
|---|---|---|---|---|
| Airspace | $C_3 = 6.209$ | $d_2 = 0.013$ | | |
| 134 | $C_4 = -0.147$ | $d_3 = 0.033$ | 1.658 | 57.3 |
| 136 | $C_5 = 4.924$ | $d_4 = 0.005$ | 1.702 | 41.0 |
| Airspace | $C_6 = 1.564$ | $d_5 = 0.160$ | | |
| 138 | $C_7 = 1.001$ | $d_6 = 0.022$ | 1.641 | 60.1 |
| 140 | $C_8 = 0.618$ | $d_7 = 0.005$ | 1.601 | 38.2 |
| Airspace | $C_9 = -8.000$ | $d_8 = 0.040$ | | |
| 132 | $C_{10} = -6.000$ | $d_9 = 0.042$ | 1.569 | 56.1 |

In the foregoing system, the speed = f/6.3 and the distance to the image is 0.652 of the focal length.

Figure 6:
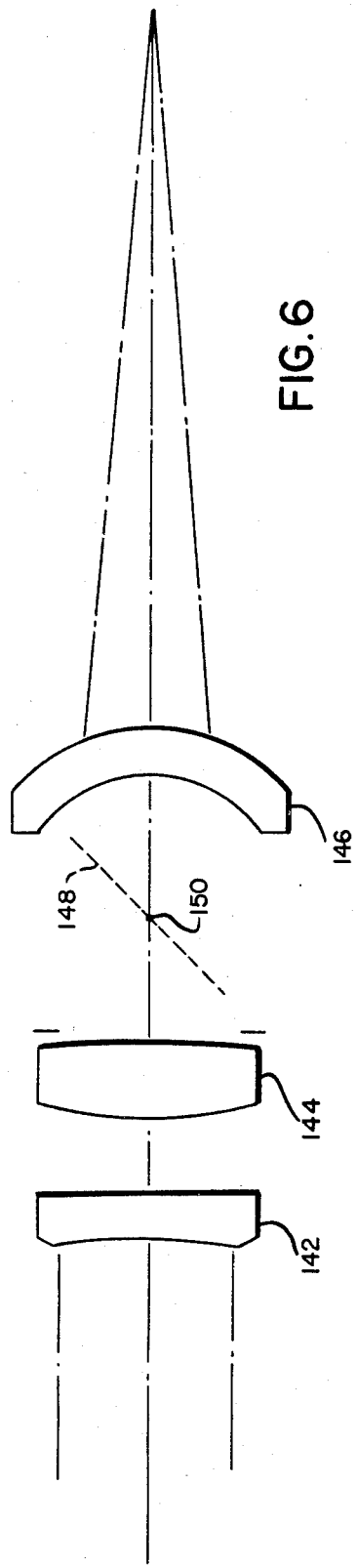
FIG. 6 is an unfolded, cross-sectional, layout view of an inverted triplet lens array embodying the present invention.

The Optical System of FIG. 6

The optical system of FIG. 6 is in the form of an inverted triplet including a negative lens element 142, a positive lens element 144 and a negative lens element 146. In this optical system, elements 142, 144 and 146 remain stationary and a scanning mirror 148 pivots about the center 150 of shell lens 146. The relative height is greater than unity at lens element 144. While large field angles cannot be obtained easily in this way, this system is characterized by a final panoramic picture that is free of distortion, cylindrical perspective errors and the like.

Numerical details of the optical system of FIG. 6 are presented in the following table, in which the values of curvature (C) and distance (d) are in terms of equivalent focal length:

TABLE 5

| Lens or Airspace | Curvature | Thickness or Spacing | Index of Refraction $N_d$ | Abbe Number $V_d$ |
|---|---|---|---|---|
| 142 | $C_1 = -1.228$ | $d_1 = 0.042$ | 1.670 | 39.2 |
| Airspace | $C_2 = 0.039$ | $d_2 = 0.066$ | | |
| 144 | $C_3 = +2.892$ | $d_3 = 0.066$ | 1.588 | 68.2 |
| Airspace | $C_4 = -0.907$ | $d_4 = 0.242$ | | |
| 146 | $C_5 = -8.000$ | $d_5 = 0.042$ | 1.699 | 30.1 |
| | $C_6 = -6.000$ | | | |

In the foregoing system, the speed = f/6.3 and the distance from $C_6$ to the image is 0.676 of the focal length.

Figure 7:
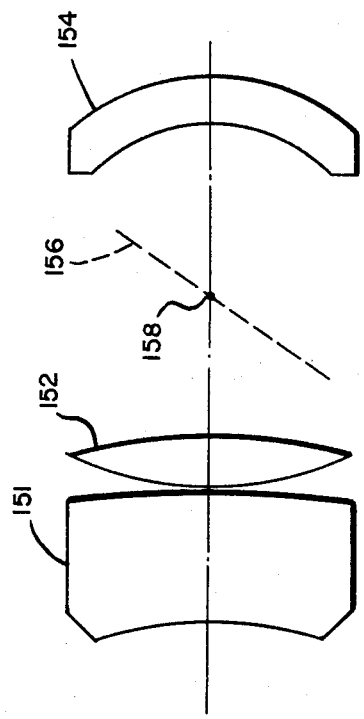
FIG. 7 is an unfolded, cross-sectional, layout view of another inverted triplet lens array embodying the present invention.

The Optical System of FIG. 7

The optical system of FIG. 7 is in the form of an alternative inverted triplet including a thick negative meniscus lens 151, a double convex lens 152 and a shell lens 154. Lenses 151 and 154 are composed of styrene and lens 152 is composed of methyl methacrylate. In this optical system also, lens elements 151, 152, 154 remain stationary and a scanning mirror 156 pivots about the center 158 of shell lens 154. In this cave, as in the case of the optical system of FIG. 6, the elements located on the long conjugate side of the scan mirror need not move so that the primary reason for the shell lens is higher order correction together with convenient lens positioning. This fact emphasizes that in scan systems, shells are most useful on the short conjugate side of the lens system.

Numerical details of the optical system of FIG. 7 are presented in the following table, in which the values of curvature (C) and distance (d) are in terms of equivalent focal length.

TABLE 6

| Lens or Airspace | Curvature | Thickness or Spacing | Index of Refraction $N_d$ | Abbe Number $V_d$ |
|---|---|---|---|---|
| 151 | $C_1 = -2.607$ | $d_1 = 0.116$ | 1.592 | 31.2 |
| Airspace | $C_2 = -0.583$ | $d_2 = 0.011$ | | |
| 152 | $C_3 = 3.082$ | $d_3 = 0.002$ | 1.492 | 56.0 |
| Airspace | $C_4 = -2.083$ | $d_4 = 0.271$ | | |
| 154 | $C_5 = -8.000$ | $d_5 = 0.042$ | 1.592 | 31.2 |
| | $C_6 = -6.000$ | | | |

In the foregoing system, the speed = f/6.3 and the distance from $C_6$ to the image is 0.693 of the focal length.

CONCLUSION

The foregoing disclosure thus provides novel optical systems in which at least a pivotal component is associated with a stationary shell lens component in such a way that aberrations in the remainder of the system are corrected by the shell lens component. Each of the illustrated systems can be applied to applications other than panoramic photography, for example, in equipment characterized by a multiplicity of image planes, such as a periscope. Wherever shells are concentric around the pupil, as affected optically by intermediate refractions, such shells generally remain stationary when the scan occurs at its center of curvature, an exception being when the scan occurs on the long conjugate side of the first refracting surface for comparatively long object distances. The illustrated examples, however, have been designed specifically for the shallow hand held camera of FIG. 1. Since certain changes may be made in the above disclosure without departing from the scope of the present invention, it is intended that all matter shown in the accompanying drawing and described in the foregoing specification be interpreted in an illustrative and not in a limiting sense.

What is claimed is:

1. A corrected panoramic optical system, for forming an image at the focal plane of a scanning camera, comprising:
    an objective lens array, said objective lens array having an overall length less than one-fifth the focal length of said objective lens array;
    a shell optical element, between said objective lens array and said focal plane, the centers of curvature of said shell optical element's surfaces located at a common point toward said objective lens array; and
    means for pivoting an optical element about said point so as to minimize optical aberrations otherwise introduced into said image by scanning.

2. A corrected optical system for forming an image at the focal plane of a scanning camera, said optical system comprising, in sequence:
    a negative meniscus lens element;

a negative component including a negative bi-concave lens element and a positive meniscus lens element, said negative component separated from said negative meniscus lens element;

a positive component, including a bi-concave negative lens element and a bi-convex positive lens element, said positive component separated from said negative component, said positive component, said negative component, and said negative meniscus lens element forming an objective lens array adapted to pivot about a point located between the first and last refractive surfaces of said objective lens array;

a shell optical element, separated from said objective lens array and located between said objective lens array and said focal plane, having its radii of curvature located at said point.

3. The optical system described in claim 2, wherein said shell optical element is a lens.

4. The optical system described in claim 3, having design parameters for unit focal length, F, represented by the following table:

| Lens or Airspace | Curvature | Thickness or Spacing | Index of Refraction $N_d$ | Abbe Number $V_d$ |
|---|---|---|---|---|
| 84 | $C_1 = 1.609$ | $d_1 = 0.006$ | 1.501 | 56.4 |
| Airspace | $C_2 = 1.723$ | $d_2 = 0.030$ | | |
| 86 | $C_3 = -0.963$ | $d_3 = 0.006$ | 1.501 | 56.4 |
| 88 | $C_4 = 4.966$ | $d_4 = 0.016$ | 1.617 | 31.0 |
| Airspace | $C_5 = 2.432$ | $d_5 = 0.040$ | | |
| 90 | $C_6 = -1.348$ | $d_6 = 0.006$ | 1.617 | 31.0 |
| 92 | $C_7 = 3.651$ | $d_7 = 0.020$ | 1.691 | 54.7 |
| Airspace | $C_8 = -4.024$ | $d_8 = 0.240$ | | |
| 82 | $C_9 = -3.500$ | $d_9 = 0.016$ | 1.501 | 56.4 |
| | $C_{10} = -3.314$ | | | | wherein the numerals indicate the sequence of the lens elements in order from front to rear; $N_d$ is the refractive index for a light wavelength of 587.6 nanometers; $V_d$ is the Abbe ratio; $C_1$, $C_2$, etc., represent the curvatures of successive surfaces from front to rear; and $d_1$, $d_2$, etc., represent the air or glass separations between successive surfaces.

5. The optical system described in claim 3, having design parameters for unit focal length, F. represented in the following table:

| Lens or Airspace | Curvature | Thickness or Spacing | Index of Refraction $N_d$ | Abbe Number $V_d$ |
|---|---|---|---|---|
| 106 | $C_1 = 5.142$ | $d_1 = 0.025$ | 1.641 | 60.1 |
| Airspace | $C_2 = 0.292$ | $d_2 = 0.106$ | | |
| 108 | $C_3 = -2.853$ | $d_3 = 0.005$ | | |
| | $C_4 = 5.149$ | $d_4 = 0.013$ | | |
| Airspace | $C_5 = 5.235$ | | | |
| 110 | $C_6 = -0.245$ | $d_5 = 0.025$ | 1.501 | 56.4 |
| Airspace | $C_7 = -8.000$ | $d_6 = 0.190$ | | |
| 102 | $C_8 = -6.000$ | $d_7 = 0.042$ | 1.501 | 56.4 |
| Airspace | $C_9 = $ plano | $d_8 = 0.005$ | | |
| 104 | $C_{10} = -2.597$ | $d_9 = 0.385$ | 1.640 | 60.1 | wherein the numerals indicate the sequence of the lens elements in order from front to rear; $N_d$ is the refractive index for a light wavelength of 587.6 nanometers; $V_d$ is the Abbe ratio; $C_1$, $C_2$, etc., represent the curvatures of successive surfaces from front to rear; and $d_1$, $d_2$, etc., represent the air or glass separations between successive surfaces.

6. A corrected optical system, for forming an image at a focal plane, comprising:

a positive convex planar lens element;

a doublet having a bi-concave negative lens element and a convex planar lens element air spaced from said bi-concave negative lens element, said doublet being separated from said positive convex planar lens element; and a shell lens element, separated from said doublet, having its centers of curvature at a common point between said shell lens element and said doublet.

7. The corrected optical system described in claim 6, further comprising:

a Schmidt type lens component between said shell lens element and said focal plane having an aspheric curvature on the surface closest to said shell lens and the center of curvature of its rearmost surface located at said surface.

8. The corrected optical system described in claim 6, further comprising:

a Schmidt type lens component between said shell lens element and said focal plane, the center of curvature of its rearmost surface coinciding with the centers of curvature of said shell lens element.

9. A corrected optical system, for forming an image at a focal plane, comprising:

a positive meniscus lens element, concave toward said focal plane;

a doublet, separated from said positive meniscus, having a bi-concave negative lens element and a positive meniscus lens convex toward said focal plane, said positive meniscus lens element and said doublet serving as an objective lens array; and a shell lens component having its centers of curvature at a common point located within said objective lens array and said objective lens array is adapted to pivot about said point.

10. The optical system described in claim 9, having design parameters for unit focal length, F, represented in the following table:

| Lens or Airspace | Curvature | Thickness or Spacing | Index of Refraction $N_d$ | Abbe Number $V_d$ |
|---|---|---|---|---|
| 122 | $C_1 = 3.243$ | $d_1 = 0.025$ | 1.640 | 60.1 |
| Airspace | $C_2 = 0.880$ | $d_2 = 0.037$ | | |
| 124 | $C_3 = -1.671$ | $d_3 = 0.005$ | 1.564 | |
| Airspace | $C_4 = 3.129$ | $d_4 = 0.005$ | | |
| 126 | $C_5 = -1.536$ | $d_5 = 0.025$ | 1.640 | 60.1 |
| Airspace | $C_6 = -5.844$ | $d_6 = 0.065$ | | |
| 118 | $C_7 = -8.000$ | $d_7 = 0.042$ | 1.501 | 56.4 |
| | $C_8 = -6.000$ | | | | wherein the numerals indicate the sequence of the lens elements in order from front to rear; $N_d$ is the refractive index for a light wavelength of 587.6 nanometers; $V_d$ is the Abbe ratio; $C_1$, $C_2$, etc., represent the curvatures of successive surfaces from front to rear; and $d_1$, $d_2$, etc., represent the air or glass separations between successive surfaces.

11. A corrected optical system having design parameters for unit focal length, F, as represented in the following table:

| Lens or Airspace | Curvature | Thickness or Spacing | Index of Refraction $N_d$ | Abbe Number $V_d$ |
| --- | --- | --- | --- | --- |
| 131 | $C_1 = 0.400$ | $d_1 = 0.010$ | 1.501 | 56.4 |
| Airspace | $C_2 =$ plano | $d_2 = 0.013$ | | |
| 134 | $C_3 = 6.209$ | $d_3 = 0.033$ | 1.658 | 57.3 |
| 136 | $C_4 = -0.147$ | $d_4 = 0.005$ | 1.702 | 41.0 |
| Airspace | $C_5 = 4.924$ | $d_5 = 0.160$ | | |
| 138 | $C_6 = 1.564$ | $d_6 = 0.022$ | 1.641 | 60.1 |
| 140 | $C_7 = 1.001$ | $d_7 = 0.005$ | 1.601 | 38.2 |
| Airspace | $C_8 = 0.618$ | $d_8 = 0.040$ | | |
| 132 | $C_9 = -8.000$ | $d_9 = 0.042$ | 1.569 | 56.1 |
| | $C_{10} = -6.000$ | | | | wherein the numerals indicate the sequence of the lens elements in order from front to rear; $N_d$ is the refractive index for a light wavelength of 587.6 nanometers; $V_d$ is the Abbe ratio; $C_1$, $C_2$, etc., represent the curvatures of successive surfaces from front to rear; and $d_1$, $d_2$, etc., represent the air or glass separations between successive surfaces.

12. A corrected optical system having design parameters for unit focal length, F, as represented in the following table:

| Lens or Airspace | Curvature | Thickness or Spacing | Index of Refraction $N_d$ | Abbe Number $V_d$ |
| --- | --- | --- | --- | --- |
| 142 | $C_1 = -1.228$ | $d_1 = 0.042$ | 1.670 | 39.2 |
| Airspace | $C_2 = 0.039$ | $d_2 = 0.066$ | | |
| 144 | $C_3 = +2.892$ | $d_3 = 0.066$ | 1.588 | 68.2 |
| Airspace | $C_4 = -0.907$ | $d_4 = 0.242$ | | |
| 146 | $C_5 = -8.000$ | $d_5 = 0.042$ | 1.699 | 30.1 |
| | $C_6 = -6.000$ | | | | wherein the numerals indicate the sequence of the lens elements in order from front to rear; $N_d$ is the refractive index for a light wavelength of 587.6 nanometers; $V_d$ is the Abbe ratio; $C_1$, $C_2$, etc., represent the curvatures of successive surfaces from front to rear; and $d_1$, $d_2$, etc., represent the air or glass separations between successive surfaces.

13. A corrected optical system having design parameters for unit focal length, F, as represented in the following table:

| Lens or Airspace | Curvature | Thickness or Spacing | Index of Refraction $N_d$ | Abbe Number $V_d$ |
| --- | --- | --- | --- | --- |
| 151 | $C_1 = -2.607$ | $d_1 = 0.116$ | 1.592 | 31.2 |
| Airspace | $C_2 = -0.583$ | $d_2 = 0.011$ | | |
| 152 | $C_3 = 3.082$ | $d_3 = 0.002$ | 1.492 | 56.0 |
| Airspace | $C_4 = -2.083$ | $d_4 = 0.271$ | | |
| 154 | $C_5 = -8.000$ | $d_5 = 0.042$ | 1.592 | 31.2 |
| | $C_6 = -6.000$ | | | | wherein the numerals indicate the sequence of the lens elements in order from front to rear; $N_d$ is the refractive index for a light wavelength of 587.6 nanometers; $V_d$ is the Abbe ratio; $C_1$, $C_2$, etc., represent the curvatures of successive surfaces from front to rear; and $d_1$, $d_2$, etc., represent the air or glass separations between successive surfaces.

* * * * *